Patented June 3, 1941

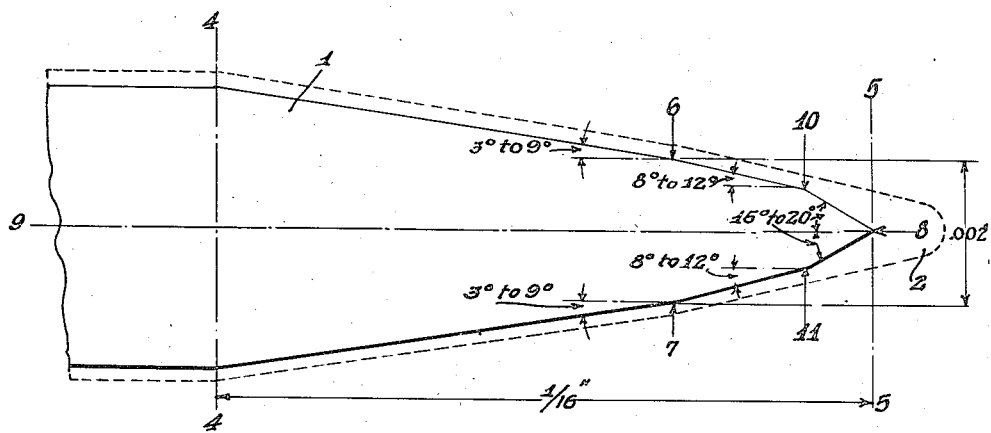

2,244,053

UNITED STATES PATENT OFFICE 2,244,053

HARD CEMENTED CARBIDE COMPOSITE

Gregory J. Comstock, Fairfield, Conn.

Original applications June 22, 1935, Serial No. 2,959, and September 23, 1937, Serial No. 165,314. Divided and this application February 22, 1938, Serial No. 191,850

2 Claims. (Cl. 30—350)

The present invention is a division of application Serial No. 2,959, filed January 22, 1935, and of application Serial No. 165,314, filed September 23, 1937.

This invention relates to fine cutting edges of hard cemented carbide composites such as razor blades, surgical instruments, dental tools and other fine edge cutting tools, and the compositions of hard cemented carbide metals such as the tungsten, titanium and tantalum carbides or combinations thereof composited with metallic binding or cementing material or materials.

Although the properties of the hard cemented carbide compositions have long been known to be such as to render them eminently desirable as cutting surfaces, the lack of proper methods of working these hard cemented carbides has made it impossible to employ them for other than relatively blunt edges such as are used for cutting lathes or metal working tools. These properties of the hard cemented carbide compositions which render them specially adaptable for use as cutting edges are extreme hardness, resistance to corrosion, and unusual strength in retaining cutting edges.

As I have set forth, although these general properties as cutting edges have been recognized, the present methods have made them available only as tools for machining metals and dies for drawing wire. These methods which have been able to produce relatively blunt edges fail completely when it is attempted to make thinner or more delicate edges such as razor blade edges or fine cutting blades.

The present invention, which will be set forth more fully hereinafter, now makes possible formation of the hard cemented carbide compositions into fine cutting edges such as edges which, at a magnification of 250 diameters, approach zero thickness at the extreme cutting edge, and which have a fine cutting edge in which the particle size at the extreme cutting edge is in itself reduced. Inasmuch as the particle size of the hard cemented carbide constituent is in itself extremely small, it will be understood that reduction of this particle size produces an extremely sharp edge.

Hard cemented carbide tool shapes are at present commonly formed by pressing the powdered components into the form of small billets which are then subjected to a heat treatment at a relatively low temperature, which is referred to in the art as presintering. This heat treatment increases the cohesion of the pressed powders to an extent which makes them resemble talc or graphite in their strength characteristics. In this condition the material is worked into tool tip or other form by filing, sawing or other similar means of material detachment. A final heat treatment or sintering operation is then applied to the shaped presintered material. This consists in heating it to a sufficiently elevated temperature to melt the binder but not the more refractory hard carbide. After final sintering, the material is, in effect, an aggregate consisting of fine particles of hard refractory metallic carbide which are set or cemented in a strong metal matrix which is formed by the melted and solidified binder or an alloy of the binder and the refractory metallic carbide. Dies for drawing wire and other shapes can, if desired, be pressed into final form and sintered without shaping in the presintered state.

Under certain circumstances, the mixed carbide and binder powders are subjected to the simultaneous application of heat and pressure. In this method, which is known in the art as the "hot press method," the material takes its final form from the conformation of the mold in which the powders are pressed and heated, and no shaping in a soft intermediate state is practiced.

It is not possible to produce "fine cutting edges" or minute cutting contours, such as those which are required for razor blades, surgical instruments or other fine edge cutting tools, by any of these means for reasons which will be made clear in the following brief summary of the principles which are involved.

In the formation of objects or articles of hard cemented carbide compositions, their final shape or form must be communicated to them in one of three stages of their manufacture. The mixed powders can be (1) pressed to final shape and sintered to final hardness with or without presintering; (2) pressed and presintered and shaped in that state before final sintering; or (3) pressed and sintered with or without presintering and shaped in the final ultra-hard condition which approaches that of a diamond.

*The compacted and presintered state of the prior art*

Pressing the mixed powders into the form of fine cutting edges has not been found practical, as in this state the material is extremely weak even if heavy compacting pressures have been employed. Pressed powders are friable and can be resolved again to powder between the fingers. In consequence, thin cutting edges and delicate contours cannot be pressed and removed from the mold or handled in the necessary subsequent heat-treating operations without damage to thin sections of the character which is requisite for razors or similar thin edged cutting instruments.

As previously practiced, the presintering operation resulted in a material having a cohesive strength of the order of that of talc or graphite. While material in this condition was stronger than the compacted powders previous to the application of this heat treatment and was, therefore, easily worked into blunt edges and simple contours of more or less massive character, fine edges suitable for razors and the like could not be shaped from it, for, no matter how delicately this shaping was conducted by filing, grinding or other means, spalling of thin sections of this relatively weak material invariably resulted during the shaping operation.

Furthermore, as the gain in cohesion which is communicated to the compacted powders by presintering is the result of the adhesion of the particles, as no melting of the binder component has taken place at the temperatures which have been employed, whole carbide particles are removed when presintered material is shaped to final form. The development of thin cutting edges, therefore, depended upon the size and relative position of the hard carbide particles which are left to form the edge after such shaping has been applied. As previously conducted, the presintering operation promoted only weak adhesion between the particles of which the material consists and the removal of these weakly adhering particles by any means of material detachment resulted in edges which were unsuitable for razors or surgical instruments or thin cutting edges of this general character when the final hardness had been communicated to them by the final sintering operation.

When the final shaping of relatively heavy sections of hard cemented carbide material is performed upon it in its final almost diamond-like ultra-hard condition, it has been found that when sufficient pressures are applied to efficiently promote grinding into thin sections, spalling of the delicate edges invariably results.

If fine razor-like cutting edges are to be satisfactorily produced, such grinding must be conducted under conditions which actually cut or wear away the hard carbide particles themselves without detaching them from their metal matrix. As hard carbide particles of this character have been classified as being harder than a sapphire and only slightly less hard than a diamond, cutting them to produce a fine edge is both laborious and inefficient unless the material is first formed to a minimum thickness. Moreover, this involves pressures which remove the desired edge as it is formed if it is attempted on thick sections of the final sintered material.

Those skilled in the art, familiar with the difficulties which are involved in the production of thin edges of the character which has been described, have unsuccessfully endeavored to overcome them by modifying the hardness of the final sintered hard material either by regulating the proportion of binder to hard carbide component; by substituting carbides which would be less difficult to cut in the final hard sintered condition than those originally employed in materials of this kind; or by attempting to increase the efficiency of the grinding methods which are applied to the final hard product.

*The present invention*

In general, the present invention involves a product produced by a process which I have developed in the field of the previously not very well understood and rather neglected presintering operation. It became apparent to me that if the strength and cohesion of the material in this stage of the manufacture of hard cemented carbide materials could be increased sufficiently to permit the development of relatively thin sections instead of the comparatively thick and massive edges which only could previously be produced from the soft presintered material, that ultimately thin razor-like cutting edges could be made by delicately cutting or lightly lapping such thin sections after they were final sintered. Provided such thin sections were afforded for final cutting of this character, very much reduced grinding or lapping pressures can be employed and the final edge which must be composed of cut carbide particles can be developed without spalling the cutting edges as they are produced.

The cohesion which results from presintering is produced by one or both of two cementing reactions which take place during that operation. The first involves adhesion between adjacent binder particles or binder coated hard carbide particles and the second the reduction of impinging films of binder oxides. Regulation of these two phenomena permits the development of controlled cohesion of the presintered material and the regulation of its strength to meet the grinding or shaping requirements of special shapes or contours.

When compacted binder particles or binder coated hard carbide particles are heated to a suitable temperature, adhesion takes place between them and they attach themselves one to another, providing they are composed of suitable metallic elements or alloys. This is a well-known phenomenon which takes place considerably below the true melting point of metals or alloys when oxide-free surfaces thereof are held closely together and are heated in this condition; for example, massive sheets of silver can be welded in this manner and show a continuous grain structure directly through the welded material. Copper, iron, nickel, cobalt, certain ferrous alloys and a number of metals and alloys both in massive and powdered form display the same effect. The adhesion of adjacent binder particles or binder coated carbide particles impart strength and cohesion to the mass of the material in proportion to the efficiency to which this adhesion is developed. Increased particle adhesion and increased strength and cohesion of presintered material can, therefore, be encouraged by (1) increasing the compacting pressure which is applied to the mixed powders, which will result in greater distortion and in presenting more binder surfaces in contact with one another and will increase proportionately one of the conditions necessary to the adhesion phenomenon; (2) increasing the temperature of presintering, which also proportionately increases one of the conditions which are necessary for promoting adhesion and will make corresponding increases in the adhesion which takes place.

Increasing the cohesion or strength of the presintered material by increasing the adhesion existing between the particles of which the material in this stage of its fabrication is composed is, accordingly, an object of my invention. I employ a variety of means for accomplishing this desirable condition, which will be hereinafter described in detail.

Stated somewhat differently, my invention resides in varying the pressure, temperature and composition to obtain a degree of strength and cohesion in the presintered stage which will enable grinding to the desired "fine edge."

In general, I have found that two of the prime requisites for promoting satisfactory adhesion between binder particles or binder coated hard carbide particles are heat and pressure—pressure to deform such particles so that a maximum area of contacting surfaces are presented for adhesion; heat to promote the adhesion of such contacting surfaces to the greatest extent possible without actually melting the true binder material.

Moreover, I take advantage of the phenomena that may be illustrated by a similar effect which is produced where two sheets of oxide-free clean metals, such as silver, are placed one upon the other and are heated under proper conditions to a temperature which is well below the true melting point of the metals; adhesion will take place between the sheets only where they are in contact with one another. Silver sheets, for example, will adhere under these conditions when heated to as low a temperature as 500° F., although the melting point of silver is 1762° F. Heating to a higher temperature promotes grain growth at contacting points and has some effect on the strength of the bond which is produced. If the sheets are not flat and have only a few points of contact between them, less adhesion will naturally take place and less force will be required to separate them. If, however, pressure is applied to such sheets when they are placed one upon the other previous to heating them in this relationship, they will, if soft and ductile, be deformed so that a greater contact area is secured between them and when heated after such deformation they will have a correspondingly greater area of adhering surfaces. A correspondingly greater force will be required to separate them after this dual treatment. It should be noted that the sole step of increasing the temperature which is applied to the sheets which are not flat and have but few contacts between them could not be expected to increase adhesion to an extent which is at all comparable to pressing them until a maximum area of contact was afforded and then applying the optimum temperature for promoting adhesion. This is cited to explain the principles which are involved in one method which I propose for increasing the cohesion of presintered materials, as it involves the regulation of pressure and heat to promote maximum adhesion between binder particles or binder coated hard carbide particles.

One of the preparatory operations consists in mixing the hard carbide powder with the binder material which is also in powder form. This is done under conditions which tend to form a coating or pellicle of the binder on each hard carbide particle.

Increased cohesion may also be effected by temporarily oxidizing the binder coated carbide particles in the ball milling or mixing operations. These oxide films when pressed together during compacting, impinge upon one another and intermingle, as they are chalky or pulverant in nature as are most oxides of this kind. Heating these impinging oxide films in a strongly reducing atmosphere reduces them to metallic form. Cohesion and strength is imparted to the mass of the material when the particles are cemented in this manner in proportion to the degree to which the cementing action is carried.

Increased strength and cohesion in the presintered hard carbide materials is thus promoted by encouraging the formation of more impinging oxide films or coatings which thereby increases the cementing action which results from the formation of more metallic cement formed from newly reduced binder oxides. Contrary to the present practice, I therefore promote oxidation during the grinding operation, as described more fully hereinafter.

The oxide coating further functions to permit the application of pressures heretofore regarded as impractical if not impossible. Excessive pressures even with the usual lubrication ordinarily result in the formation of cracks, a phenomenon which has heretofore definitely limited compacting pressures to the order of 10,000 to 20,000 lbs. per sq. in. The oxide coating adds sufficient lubricating properties to permit increased pressures to 60,000 pounds per square inch without serious danger in the formation of cracks.

To further insure adhesion, I provide, in addition to the usual high temperature binder, a low temperature binder. This binder upon the application of a relatively low temperature in the presintered stage, melts to form a temporary bond between the compressed carbide powders. In the later operations, at the higher sintering temperatures, this binder may be removd by volatilization or be alloyed with the true binding material or simply bound by it if no alloying can take place.

Having thus secured the desired increase in strength or cohesion by the application of controlled heat and pressure, the oxidation of the binder pellicle, and the low temperature bond, I produce in the presintering steps a composite which has a sufficient increase in strength and cohesion over the presintered product of prior processes to permit the grinding from the pressed object of a relatively fine edge, i. e., an edge of which the thickness may be of the order of the thickness of the carbide powder particles themselves.

Due to the increased binding action produced by the combination of controlled high pressure and temperature; low temperature binder and the oxidation of the carbide pellicle coatings, there is sufficient cohesion so that grinding to a relatively fine edge can be carried on without spalling of the thin sections.

Such thin sections may now be final sintered and the edge thereafter lapped in the final process. In this latter operation, the individual grains of the cemented hard carbide powder are ground, producing an edge whose thickness is less than the thickness of the individual carbide particles which make up the original powder. The extreme edge of the blade may comprise cut carbide particles which may or may not be larger than average particle dimension. The cut particle produces a very fine edge. The edge may also comprise the hard carbide particle itself without reduction in size.

The presintering operation may be carried out in two steps in order that more controlled shaping may be effected. Thus the first presinter may be carried out for a tungsten carbide-cobalt composition at a temperature of about 1950° F., whereupon it is formed into a rough razor blank by grinding or abrasion. The rough ground razor blank is then given a second presinter at a higher temperature range from 2100° to 2250° F. This double presintering is more efficient than the single presintering inasmuch as the rough shaping work is done while the material is not so strongly bonded by the adhesion of the binder. This two-stage presintering operation has certain advantages which will be set forth more fully hereinafter.

As will now be clear from the above, an object of my invention is to produce a novel "fine edge" product of hard cemented carbide; to produce such a product by a control of the strength and cohesion in the presintered stage; more specifically, to increase and regulate the cohesion of the presintered product by increasing its particle adhesion by the combined action of pressure and temperature and, by a temporary binder, to enable grinding the presintered product to a "fine edge" of approximately the dimensions of the powdered carbide; and to employ a predetermined composition and fineness of powder.

A further object of my invention is to produce a novel razor blade.

Still a further object of my invention is to produce a novel presintered hard cemented carbide.

Still a further object of my invention is to provide a novel composition of hard cemented carbide.

There are other objects of my invention which together with the foregoing will appear in my detailed description which follows:

The figure is a cross-section of a hard cemented carbide cutting edge as for razors.

Referring now more specifically to the figure, I show a razor blade 1 which has been cut from the roughly formed hard cemented carbide blank 2. This blank 2 is formed while the material is in the presintered condition and the final shaping from the blank 2 to the final razor 1 is performed after the final sintering. The fine edge of this razor blade can be specifically illustrated by setting forth a range of angles which has been found to exist in razor blades formed according to the process of the present invention. The distance from the line 4—4 to the line 5—5 is $\frac{1}{16}$ of an inch. The distance from the point 6 to the point 7 is .002 inch. 8 indicates the edge of the cutting blade 1, which at 250 magnifications still shows a vanishing point.

With respect to the line 8—9, the line 8—10 is at an angle of fifteen to twenty degrees. With respect to the same line 8—9, the line 6—10 is at an angle of eight to twelve degrees. With respect to the same line 8—9, the line 4—6 is at an angle of three to nine degrees. By lines I mean the surface of the cutting edge at the particular points indicated. The lower surface of the cutting blade has the same angles as those set forth above.

It is to be understood that the drawing is merely diagrammatic and that the distances of $\frac{1}{16}$" and .002" are approximate and can be varied to a certain extent. The distance from line 4—4 to the points 6, 7 is usually hollow ground on a 3 to 5 inch radius.

Compositions employed in the invention

In carrying out my invention, I employ any one of the following carbides or any preferred combination thereof:

Tungsten carbide (WC) which is a compound of approximately 94% tungsten and 6% carbon;

Tantalum carbide (TaC) which is a compound of approximately 94% tantalum and 6% carbon.

Titanium carbide (TiC) which is a compound of approximately 80% titanium and 20% carbon.

I may, in accordance with my invention, mix the oxides of two or more carbide-forming metals and carburize them, forming carbides of the metals simultaneously.

It is of considerable advantage to employ hard carbide which has been reduced to an extremely fine state of subdivision. Particles of sub-colloidal character would be of material assistance in the production of fine cutting edges by material detachment means. Presintered material consisting of such fine carbide particles could be shaped by material detachment means to make thinner edges if composed of fine particles than if composed of coarser ones, as the dimensions of the final presintered edge will be on the order of the dimensions of the hard carbide particles. I prefer to employ, therefore, such fine sub-colloidal hard carbide powders and to perform upon them the operations which have just been described in detail. It has been customary to employ powdered hard carbide, the particles of which are on the order of one-half millionth of an inch in their larger dimensions. The powders I refer to above would be of very much lesser size, being so minute as to stay in suspension in water.

For my binder, I employ metallic cobalt, although metallic nickel may also be used, particularly with tantalum carbide.

The proportion of binder and hard carbide powders may be varied from 6% to 20% by weight of binder in accordance with the hardness which is desired and the particular utility of the final product, such as for razor blades or one of the numerous types of dental tools.

It should be noted in considering these compositions, that as the softer binder component increases, there is a noted decrease in hardness due to the lesser proportions of the hard carbide constituent. There is also a corresponding increase in toughness and strength and resistance to transverse rupture.

A further factor in determining these proportions is the shrinkage during sintering due to the melting of the binder which fills the voids formed by the hard carbide particles. Particle size and binder proportions are regulated to afford minimum shrinkage.

I may also employ iron as a binder material. The chief difficulty in the use of iron has been the production of extremely brittle final sintering material; that is, brittle in the sense that it could not be used for tools for machining metal. On the other hand, fine cutting edges for the purposes for which I intend to employ them could be made with an iron binder without difficulty. As iron is a carbide forming material and as cobalt is not, and as the carbides may possess excess carbon which can be liberated to form a carburizing material for a binder, iron has not been successfully employed as a binder. Iron, however, can be used as a binder for fine cutting edges and I accordingly propose the following proportions using iron in this connection:

| | Per cent |
|---|---|
| Tungsten carbide | 94 |
| Iron | 6 |

I may also employ an auxiliary low melting point binder of which more will be stated hereafter.

After proportioning the component carbides and binder in the manner just described, they are mixed or ground together. This operation is conducted in a ball mill of sufficient capacity to hold from 4000 to 10,000 grams of the mixed carbides and binder powders, or more if desired.

Steel balls grind the carbide and binder for from 24 to 40 hours or even longer while the mill is in operation. During this operation the carbide particles are coated with binder.

During this mixing, I may heat the barrel slightly and introduce oxygen or air in order to slightly oxidize the pellicle of binding metal which has formed around the hard carbide particle, thus forming an oxide film around the binder coated hard carbide particles. Subsequently, on the application of further heat in a reducing atmosphere during presintering as will be described hereinafter, the oxide film will be reduced and will cement the carbide particles, producing a considerable increase in the strength and cohesion of the presintered material.

The degree of heat employed and the duration of this oxidizing treatment will vary with the materials used. I have found, however, that using tungsten carbide, for example, as a hard carbide constituent and 10% by weight of metallic cobalt in powdered form as a cementing material, that a barrel temperature of from 200° to 400° F. and an oxidizing period of about an hour at the end of the grinding period with the introduction of about three liters of oxygen at atmospheric pressure into a mill of the size previously mentioned is sufficient to produce satisfactory results.

These oxide films afford lubrication properties which permits the application of greater pressure before presintering without the formation of cracks.

During the oxidation of the binder component or the binder coated hard carbide component, I prefer to remove any balls or other grinding members from the ball mill, if this operation is conducted in a mill. This prevents the removal of the oxide coating which might otherwise be disturbed by the hammering or grinding of the balls, rods or other grinding devices commonly employed in mills of the character suitable for the grinding and mixing of hard carbides and binding materials.

I may, on the other hand, not oxidize the binder or binder coated hard carbide particles in the ball mill, but instead heat the milled powders in the open air under conditions which will oxidize them to a satisfactory degree. Under these conditions the powders should be spread out rather thinly and heated on a hot plate until a satisfactory oxidation has been accomplished. Regulation of the time and temperatures employed in this way can be made satisfactorily.

*Auxiliary binder and lubricant*

I may, as stated above, also add to the mixture introduced into the ball mill about 3% or more of a powdered auxiliary binder. This auxiliary binder has a lower melting point than the cementing metal or metals and may be added either before or after the oxidizing process just described, depending upon the type of auxiliary metal used. The function of this auxiliary metal is to cement the particles of hard carbide and the particles or pellicles of the cementing metal or metals into a transient sintered state which is desirable only for shaping the thin razor edges in the presintered stage. Subsequently, during the final sintering heat treatment, this auxiliary metal either alloys with the true cementing metal or metals or may be removed by volatilization before the higher melting cementing metal melts and performs its function of producing a metal matrix or may, in turn, be bound by the true cementing metal providing it cannot by its nature alloy with it.

Silver, copper, tin, lead, zinc, antimony or bismuth or such low melting and ductile metals may be used. In selecting them, care must be exercised to combine them suitably with the true cementing metals if they are to remain as an alloy of the ultimate metal matrix. Copper can be used satisfactorily with nickel or cobalt as an auxiliary metal in a cemented tungsten carbide composition for example. In making a composition of this kind I would, for example, mix the following powdered components in the manner which has been described, adding the copper powder after the oxidizing period: Tungsten carbide, 90% by weight; cobalt or nickel, 7% by weight; copper, 3% by weight.

I may, on the other hand, employ an auxiliary metal, such as silver, in conjunction with a true cementing metal, such as nickel, with which it does not alloy. Or, under some circumstances, I may use zinc which melts at a low temperature and is volatile before the melting point of such metals as cobalt or nickel.

A suitable composition entailing the use of silver would be: Tungsten carbide, 87% by weight; nickel, 7% by weight; silver, 6% by weight. If the zinc is used, a suitable composition would be: Titanium carbide, 87%; nickel, 9%; zinc, 4%. It should be understood that these examples are given for illustration purposes only and that the scope of my invention is not limited to the compositions mentioned.

In order to further aid in the prevention of cracks at the high pressures, I may treat the powders after the milling and previous to compacting with from 1 to 1½% paraffin applied in carbon tetrachloride. The carbon tetrachloride is then evaporated, leaving a coating of paraffin on each particle of the mixed product. Other lubricants, such as camphor in alcohol or wax in a suitable solvent may be used.

*Compacting*

After the binder and hard carbide powders have been milled in the manner which has just been described, they are then pressed into molds.

The mold employed for compacting razor edges may be rectangular in shape with a rectangular cavity ½" by 1½" to 2" extending through it, which will press a billet approximately ⅛" thick; 1½" to 2" long and about ½" wide, and equipped with top and bottom plungers and of heavy construction in order to withstand pressures of the order of 60,000 lbs. per square inch.

My mold or die may be rectangular to form billets or have an internal concavity to directly form a blank for the production of a roughly formed razor blade.

To the mold into which the powders have been placed, I will now apply pressures of the order of 60,000 lbs. and as high as 200,000 lbs. per square inch, as distinguished from the pressures of the order of 10,000 lbs. per square inch heretofore employed. These pressures are varied in accordance with the materials which are employed, the desired hardness of the presintered product and the character of the cutting edge sought.

As stated heretofore, due to the abrasive nature of hard cemented carbide materials which make them resist deformation, there is a tendency to form cracks as the pressure is increased. Accordingly, pressures heretofore have been limited to the order of 10,000 lbs. per square inch, since higher pressures result in compacting difficulties no matter what lubricating means are employed to prevent them. In accordance with my invention, the formation of the binder oxides and other suitable lubricants permits the higher pressures of 60,000 lbs. per square inch or more.

*Presintering heat treatment*

I have conducted experiments to see if higher temperatures increase the cohesion in the presintered material and have found that very little, if any, increase in cohesion results. The material simply becomes more chalky and no real strength is developed. With, however, the increase in pressure and the formation of the binder oxide coatings, an increase in temperature has resulted in a marked increase in the cohesion of the presintered material.

The selection of the presintering temperature to be used depends upon the character of the cutting edge which is to be produced, the composition of the hard cemented carbide material and binder which has been selected, and the auxiliary metal, if any, which is employed in the production of a suitable presintered state of hardness, strength and cohesion.

I have found that regulation of the temperature used during the presintering operation is an important means of increasing the hardness, strength and cohesion of the material in this state and that, contrary to general knowledge, increasing the presintering temperature, when preceded by controlled pressure during compacting, results in a proportionate increase in these characteristics up to a temperature at which the binding material melts and cements the hard carbide constituent. It has been recognized for some time that presintered material of the hardness of graphite or soapstone can be produced by treating the compacted comminuted powders at temperatures of from 1300° F. to 1760° F. It has not been recognized that increasing the presintered temperature beyond the temperatures which have been mentioned results in greater strength and hardness in almost direct proportion. I prefer an upper limit of just below the melting point of the true cementing metal or alloy. For example, with a cobalt cementing material and tungsten carbide as the metallic carbide in the proportion of, say, 94% tungsten carbide to 6% cobalt, the presintering temperature range for this particular composition would be from 1600° F. to 2600° F. and, more specifically, between 1800° F. and 2200° F., depending on the type of edge desired. With increases in the cobalt percentages, these preferred limits would be reduced slightly to from 1800° F. to 2000° F. or even 2150° F. A composition comprising tungsten carbide, 87%; cobalt, 13%, can be subjected to considerably higher pressures than the 6% binder, as the higher binder percentage means less likelihood of producing compacting cracks. With still further increases in the binder, as, for example, 80% tungsten carbide and 20% cobalt, the presintering temperature may vary from 1600° F. to 2000° F. with a more specific range from 1800° F. to 2000° F.

For mixtures of tungsten and titanium carbide, an example of which would be 16% titanium carbide, 71% tungsten carbide and 13% cobalt or nickel, the presintering temperatures would be from 1600° F. to 2000° F. and, more specifically, from 1800° F. to 2000° F.

A preferred presintering temperature for a composition employing iron as the binder as recited hereinabove is 2000° F.

*Sawing and grinding in the presintering stage*

After presintering the billet, in the manufacture of razor blades, it may be sawed into rough blanks of roughly from 1/16" by 1½" by 1/8" or 1/4". Any suitable means, such as a hacksaw or thin abrasive metal cutting disk may be employed.

The small piece is then secured in a suitable form of holder which will permit grinding it to the form of a fine cutting edge. In this operation, the piece is ground or otherwise shaped by material detachment means to approximately the thickness of the carbide particles of which the material is formed and to a shape suitable for subsequent soldering, after final sintering and lapping, to a cold drawn stainless steel section, the conformation of which will be suitable for use in connection with razor blade holding devices.

Instead of holding the presintered blade in a mechanical holder during the grinding operation, it may be more desirable to solder the presintered material to a temporary holding member, somewhat resembling the stainless steel section to which it will finally be attached. In that case, after the edge is ground or otherwise shaped to a thin edge, it is removed by melting the solder previous to the final sintering treatment of the hard carbide edge.

*Final sintering and lapping*

After the razor blade has been produced by grinding and lapping and possibly honing the presintered material into a suitable razor conformation, it is subjected to final sintering, which consists in placing it on a graphite slab or otherwise protecting or supporting it, and heating it in a reducing atmosphere until the binding material melts and sets the hard carbide constituent in a metal matrix.

The final sintering temperature and time of sintering may again vary depending on the compositions employed. In general, the lower the binder content, the higher the temperature which is employed. Thus a 3% cobalt, 97% tungsten carbide mixture is sintered at about 2800° or 2900° F. The final sintering temperature for a 94% tungsten carbide and 6% cobalt mixture is about 2600° F. or 2700° F. A mixture of 13% cobalt, 87% tungsten carbide is sintered at from 2500° F. to 2600° F. The final sintering temperature for an 80% tungsten carbide and 20% cobalt mixture is from 2200° F. to 2500° F. The sintering temperature of a tungsten carbide, 94%, iron 6% mixture is approximately 2600° F. for final sintering.

The time which is employed is also varied considerably: 3% cobalt material is commonly sintered, when small tips are being made, for 15 minutes; larger tips, or ones having higher binder content, may be sintered up to two hours in the final sintering operation.

In order to understand the structure of the article, some understanding of what occurs during sintering is necessary.

The particles of powdered carbide which are compressed are, it should be understood, extremely fine. It is, accordingly, not easy to establish their physical condition. However, their action indicates that each particle is coated during the ball milling operation with the softer and more ductile bonding material.

During the final sintering heat treatment, the cobalt or other binder melts. It should be noted that this occurs below the true melting point of the metallic binder as cobalt has a melting point of more than 2700° F. It actually melts during final sintering below this temperature. It is believed that this is due to the fact that it absorbs a certain amount of carbon from the tungsten or other carbide during its intimate contact with it and that lower melting point alloys are formed in this way. The reasons for this unusual behavior are not clear and are simply called "powder effects."

In any event, the metallic binder melts and obeys the laws of capillary action. This law states that liquids will rise in tubes of small cross-section, providing they wet the sides of the tubes. The fine interstices between the hard carbide particles represent the tubes. The tendency of tungsten carbide, titanium carbide and tantalum carbide to dissolve in the molten binder affords the wetting action, and capillary distribution of the molten binder results.

This distribution of the molten binder is ordinarily accompanied by a very startling change in dimension. During the final sintering operation, when low pressures of compacting are employed, the pieces being sintered shrink to an extent which has not been previously observed with any material. That decrease may be 20% in every dimension or a change in volume of about 40%. This is caused by the filling of the voids between the particles and the collapse and pulling together of the material by the surface tension phenomenon. This change in dimension is quite uniform and squares and rectangles shaped in the presintered form shrink almost exactly in proportion, angles being maintained with considerable accuracy.

Such shrinkage sometimes promotes distortion and then cutting edges attempted under such conditions would become fluted or out of shape. When the higher pressures I employ are used, the shrinkage is materially reduced. This may be explained by the fact that at higher pressures the voids are made smaller.

Final product

When the edge has been final sintered, it is silver soldered to a backing material and the final finishing operations will be performed after the final soldering operation. Although the finished razor will not be entirely of hard cemented carbide material, in many cases this can be done if it is found to be desirable.

In its final ultra-hard condition I propose to give it a finishing lapping or honing treatment to promote a smooth final cutting edge by the removal of any cobalt or binder which has been sweated out during the final sintering operation and the grinding down of individual cemented hard carbide particles to an edge comparable with those now produced in steel. However, I do not propose to do any grinding or lapping involving pressures which will endanger the final edge by cracking or spalling. These pressures are not necessary because of the thin edge which has previously been prepared.

Surgical instruments, dental chisels and other tools are made in the same manner. Small burr drills and pieces having minute cutting contours involving fine cutting edges are made by using fairly high binder compositions and producing a degree of cohesion in the presintered condition which will permit plastic deformation in molds.

To this end a hardened steel mold is made which has in its internal concavity an impression suitable for the production of the fine fluted edges which are characteristic of drills of this kind. A suitable size blank of presintered hard cemented carbide composition which has been prepared to afford maximum cohesion and ductility, means for which have previously been described, is inserted in this cavity. A plunger is placed upon it and a sufficient pressure applied to cause the presintered material to flow and fill out the whole cavity. The pressure is then removed, and an ejection mechanism removes the formed blank which is then final sintered. It should be noted that to compensate for shrinkage during final sintering, the pressed presintered drill or cutter shape is made slightly oversize.

Dies for this purpose are about 1" wide, 1" long and 1" high or thereabouts and contain a cavity of the desired conformation. The plunger locates the blank to be formed and presses it in the mold.

Hot press

In the above, I have described a cold process applied to my invention. I may also employ the hot press method as a means for presintering.

In the hot press, the carbide and binder particles are admitted into a mold placed between electrodes through which an electric current is transmitted from the secondary of a low voltage transformer. Simultaneously, a pressure of the order of 2,000 to 10,000 pounds per square inch is applied.

In this process, however, care must be taken to employ a mold which will not deform at the temperatures employed. Thus the ordinary metal mold will deform and is not useful for this purpose.

Heretofore in this process it has been customary to directly effect final sintering of the article in the mold and, therefore, to employ final sintering temperatures simultaneously with the application of pressure. Nor was it recognized that advantages would attain from a presintering of the article in the mold and its removal for accurate final shaping before final sintering. High temperatures on the order of 2500–2800° F. seriously affect and limit the materials from which the mold can be made as at these temperatures under the pressures which are required, distortion usually results. Using lower presintering temperatures on the order of 1600° F. to 2200° F., the problem is simplified and difficulties incident to the method as heretofore practiced are eliminated.

Thus high speed steel, stellite, which is a tungsten cobalt chromium alloy, and other alloys of similar character when used for molds at final sintering temperatures are subject to this limitation and deform at the temperatures mentioned when pressures in excess of 2000 lbs. per square inch are employed.

With my presintering process I may prefer to use a steel or alloy mold having a cavity which would impart a "fine" edge to powders placed in it, and to simultaneously heat and press these powders to a presintered state at a relatively low temperature without serious mold deformation.

In applying a hot press method to produce thin cutting edges, it is, of course, necessary to make a mold which presses a fine cutting edge, and to introduce mixed powders into this mold and subject them to simultaneous applications of heat and pressure sufficient to presinter them to the conditions of strength and cohesion described hereinabove. When presintered under these circumstances, the blank may be removed from the mold, accurately shaped to a thin edge, and final sintered without breaking, and thereafter delicately ground to a fine edge.

The final sintering may be carried out in a vacuum furnace. Certain advantages accrue with the use of a heating means with vacuum conditions. Thus, gases which are present in this heat treatment, instead of being absorbed by the hard cemented carbide composition may be withdrawn by the vacuum. Further, the vacuum condition would have a tendency to effect the elimination of contained gases and advance compaction of the hard cemented carbide composition in this final sintering operation. Since this compaction of the composition is the desideratum, the use of a vacuum furnace for final sintering presents added advantages.

I have found that by carrying out the presintering operation in two stages, improved results may also be obtained. The first presintering is carried out, as with a 94% tungsten carbide and 6% cobalt composition, by pressing the powders at from 40,000 to 60,000 pounds per square inch and presintering at 1950° F. After this first presintering treatment, the hard cemented carbide composition is harder and tougher than the presintered material of the previously known processes and can be roughed into a razor blank by material removal means comprising grinding on an abrasion belt or wheel. Thereafter, the rough ground blank is given a second presintering at 2100 to 2250° F. and in this condition is ground into an edge, the angles of which are later further refined by diamond or boron carbide lapping.

This two-stage presintering is more efficient than the single presintering inasmuch as the roughwork is done when the material is not so strongly bonded by the adhesion of the binder (cobalt) on the binder coated hard carbide (WC and Co). Thus, the fine edge shaping which requires the extra strength of the higher sinter is done when the material is in the harder (but not the final extra hard condition) presintered state. This fine edge shaping, carried out after the second and higher presinter, is performed by a lathe which revolves an adhesive disc against the presintered material and which removes particles of it by grinding. Later, after the final sintering operation, I again set up the final ultrahard block and lap with boron carbide on a copper disc of the same diameter as the abrasive wheel which was employed in preshaping the edge of the presintered blade.

The use of extremely fine particles of hard carbide are an important adjunct to the present invention, particularly when relatively high proportions of binder are employed, i. e. binder in excess of 13% by weight. It has been suggested in the prior art that the binder proportions of more than 10%, as for example about 13%, might be employed. But, hard cemented carbide compositions of this nature, that is comprising 87% carbide and 13% binder have not been successful because the relatively large proportions of the binder separated the large carbide particles so that there was marked weakness between adjacent carbide particles. I have found that by employing very small carbide particles such as on the order of $\frac{1}{10}$ to $\frac{1}{4}$ of those commonly employed in the manufacture of tool materials which are of a mean particle size of from 5 to .2 of a millionth of an inch, and by employing large proportions of binder as from more than 13% to 20% with these very fine particles, I secure a blade that is characterized by strength, toughness and elasticity. The particle size which I employ is on the order of from .02 to 1.25 of a millionth of an inch.

Delicate cutting edges of the character shown in the drawing require strength, toughness and elasticity not usual in hard cemented carbide compositions used for tools. These properties may be imparted by employing the extremely fine carbide particle size in combination with the relatively large percentage of binder such as I have set forth above.

In the above, I have given specific illustrations of the temperatures, pressures and compositions I employ in carrying out my process to produce the novel "fine edges" from hard cemented carbides. It will be obvious, however, that I am not limited to these specific values as the essence of my invention resides in such a control of these values that I obtain a presintered product which has sufficient strength and cohesion so that I may grind to the fine edges which I desire.

I claim:

1. Razor blade having an edge comprising a mixture of carbide particles of a size on the order of .02 to 1.25 of a millionth of an inch and binder on the order of 13 to 20% by weight forming a hard cemented carbide, in which the edge is of less thickness than the powdered carbide from which the hard cemented carbide was made, the said edge showing a vanishing point at 250 magnifications.

2. Razor blade having an edge comprising a mixture of carbide particles of a size on the order of .02 to 1.25 of a millionth of an inch and binder forming a hard cemented carbide in which the edge is of less thickness than the powdered carbide from which the hard cemented carbide was made, the said edge showing a vanishing point at 250 magnifications.

GREGORY J. COMSTOCK.